No. 625,793. Patented May 30, 1899.
J. R. NAYLOR.
COMBINED SPRING AND SPIKE TOOTH HARROW.
(Application filed June 29, 1898.)
(No Model.)
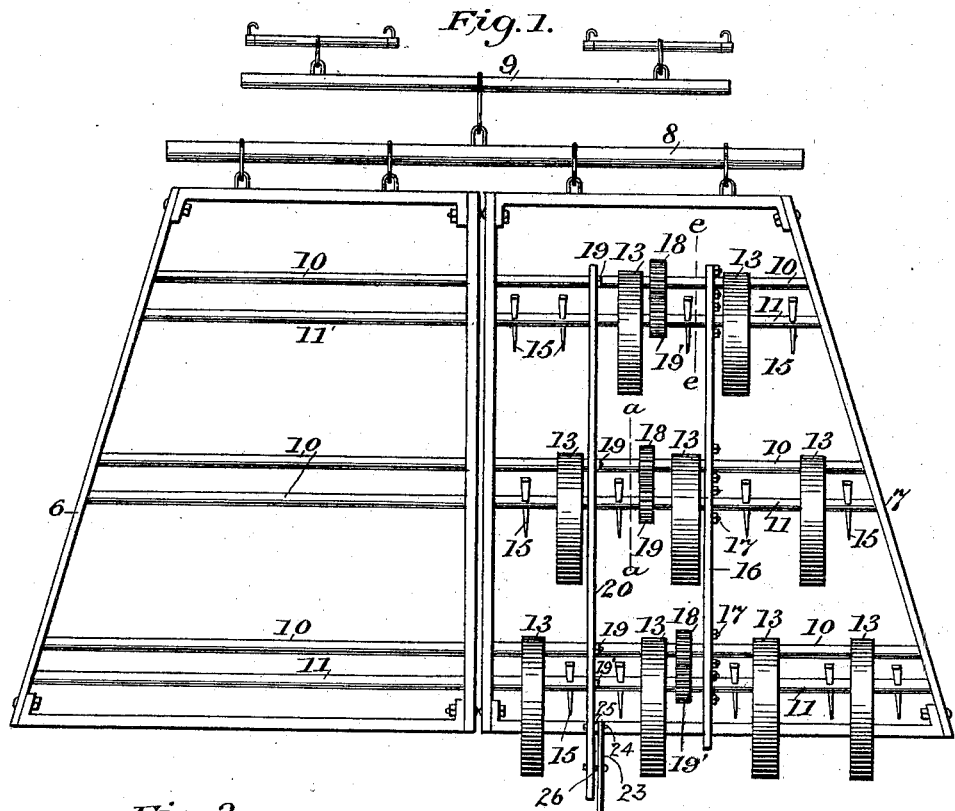
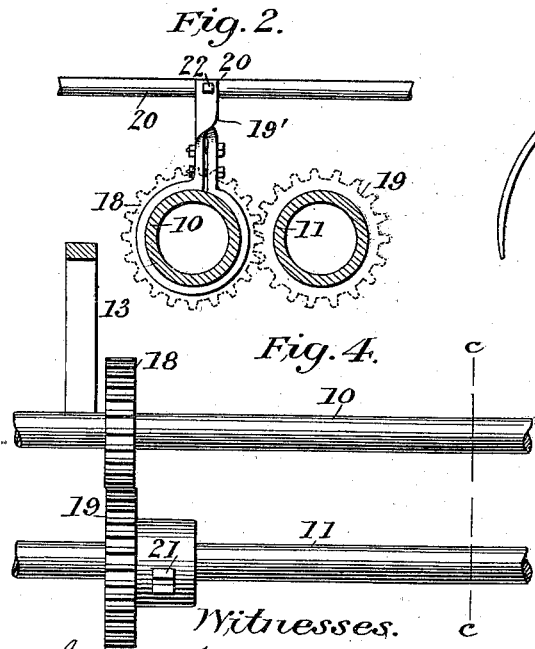
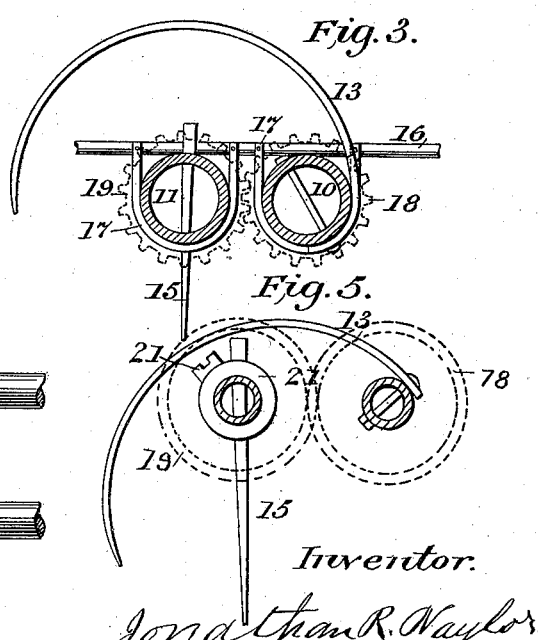
Witnesses.
Levi F. Cox
Albert Smith
Inventor.
Jonathan R. Naylor.
By Lucius C. West atty

UNITED STATES PATENT OFFICE.

JONATHAN R. NAYLOR, OF FLOWERFIELD, MICHIGAN.

COMBINED SPRING AND SPIKE TOOTH HARROW.

SPECIFICATION forming part of Letters Patent No. 625,793, dated May 30, 1899.

Application filed June 29, 1898. Serial No. 684,740. (No model.)

*To all whom it may concern:*

Be it known that I, JONATHAN R. NAYLOR, a citizen of the United States, residing at Flowerfield, in the county of St. Joseph, State of Michigan, have invented a new and useful Combined Spring and Spike Tooth Harrow, of which the following is a specification.

The object of this invention is to produce a harrow having the use of spring-teeth or of spike-teeth independently of each other and also the combined use of both styles of teeth in a single harrow, thus preventing the harrow in one instance from overloading itself, and hence lightening the draft and doing better work by the combined use of both styles of teeth.

In the drawings forming a part of this specification, Figure 1 is a plan view; Fig. 2, a section on line *a a* in Fig. 1 looking from a point at the left, with the teeth removed; Fig. 3, a section on line *e e* in Fig. 1 looking from a point at the right; Fig. 4, a broken detail from Fig. 1 in plan view, showing a change; and Fig. 5 is a section on line *c c* in Fig. 4 looking from a point at the right.

Referring to the parts of the drawings pointed out by numerals, 6 and 7 are two parts of a double-harrow frame drawn by a long evener 8 and a single-whiffletree arrangement 9. This frame is provided with sets of revoluble tooth-beams 10 and 11, near together, as in Figs. 1, 2, and 3; but the sets are separated a suitable distance from each other. On one of the beams of each set, as here shown the front beam of each set 10, are attached the spring-teeth 13, so arranged as not to trail. On the back bar 11 of each set are attached the spike-teeth 15. The design is that these spike-teeth shall not trail with each other. An arrangement of them is shown on right half of the harrow-frame shown in Fig. 1. No teeth are shown on the left half of the frame in Fig. 1; but the tooth-beams 10 and 11 are here shown. The beams are kept in alinement by a bar 16, transversely across them and attached to them by loops or U-bars 17, Fig. 3. For this reason when the gears 18 and 19 mesh the bars will keep in place. These gears, which I will now describe, are attached to the bars of each set, as Figs. 1, 2, and 3 will show, in a position to mesh with each other, so that when the bar bearing the spring-teeth is rotated to throw the spring-teeth into or out of the ground the other bars, bearing the spike-teeth, will be revolved in the opposite direction, thus throwing the spike-teeth out of the ground when the spring-teeth are thrown into the ground. This will be seen by referring to Fig. 3. By turning the beam 10 so as to throw the spring-teeth out of the ground the beam 11 will be rotated through the gears 18 and 19 in a direction to throw the spike-teeth into the ground. Gears in Figs. 2 and 3 are indicated by dotted lines.

The beams 10 have upward projections 19', to which a transverse bar 20 is attached, as shown in Figs. 1 and 2, and by moving this bar back or forward the beam 10 is rotated, and hence the other beams are rotated. This bar is of course pivotally attached at 22, as in Fig. 2, to the projection 19'. Said bar is operated by a pivotally-attached lever, as in the ordinary manner of such harrows, in which the bars are rotated to control the depth of cut.

In Fig. 1 is shown a lever 23, pivoted to a bracket or casting 25 at 24, said bracket being attached on top of and to the rear beam of the harrow-frame. The lever 23 is pivoted to the bar 20 at 26. While it is not material just what this lever arrangement consists of, this will serve to show the idea, for swinging the lever 23 forward and backward will operate the bar 20, and hence turn the beams or bars 10 and 11.

When working in a field of hard soil or soil with streaks of hard soil in it, the spike-teeth can be used either singly or in connection with the spring-teeth. In this use the hard soil will be pulverized by the spike-teeth and given a top-dressing by the spring-teeth. If the soil is all mellow, the spring-teeth can be used singly. If the soil is all hard, the spike-teeth can be used singly, if preferred, or both styles can be used. In ordinary ground the spike-teeth can be allowed to trail while the spring-teeth are doing the work, and thus support the harrow as if by runners and lighten the draft by keeping the harrow from becoming too much embedded in the soil.

I have arranged, as in Figs. 4 and 5, for the use of both styles of teeth in their full capacity at a single time by making the gears of the spike-tooth beams with hubs having a set-screw 21, and by loosening this screw the beams 11 can be tilted or turned in their end bearings, so that the spike-teeth will be in the ground at the same time the spring-teeth are in the ground. In Fig. 3 the spike-tooth is in the ground and the spring-tooth out. In Fig. 5 both teeth are in position to work in the ground.

Having thus described my invention, what I claim as new, and desire to secure by Letters Patent of the United States, is—

In combination with a harrow-frame, sets of revoluble tooth-beams, spring-teeth attached to one beam of each set, spike-teeth attached to the other beam of each set, gears connecting the beams of each set, means for rotating the beams of each set in unison to change the pitch of the teeth, the gears of one beam of each set being adjustably held attached to said beam so as to be tilted to allow the spike-teeth to work in unison with the spring-teeth, substantially as set forth.

In testimony of the foregoing I have hereunto set my hand in the presence of two witnesses.

JONATHAN R. NAYLOR.

Witnesses:
   JOHN MCNAMARA,
   HENRY COPE.